(No Model.) 3 Sheets—Sheet 2.
O. H. WATKINS.
MACHINE FOR MAKING HAY AND STRAW ROPE.
No. 458,605. Patented Sept. 1, 1891.
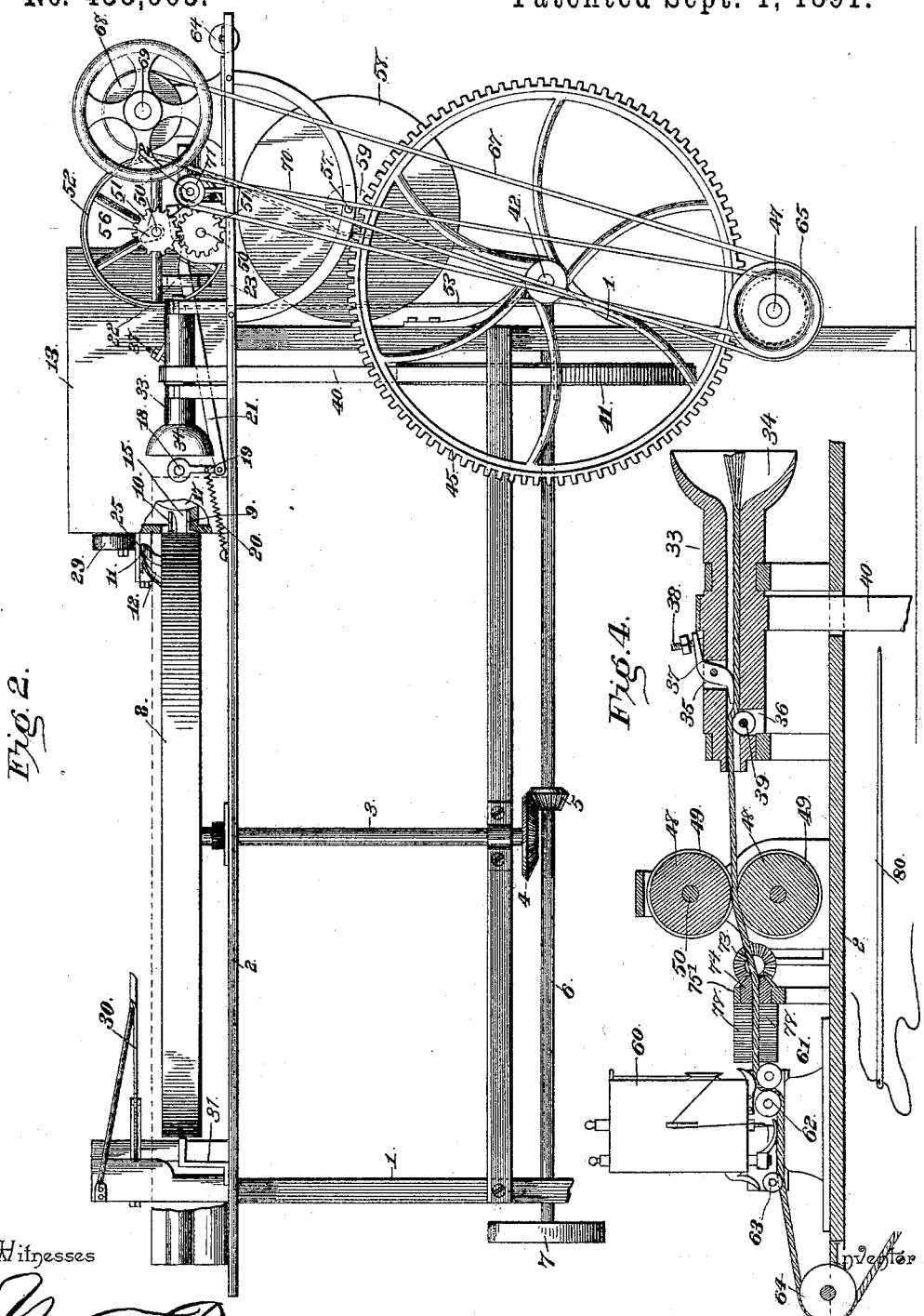
Witnesses
Wm. Bagger
M. Fowler
By his Attorneys,
C. A. Snow & Co.
Inventor
O. H. Watkins (No Model.) 3 Sheets—Sheet 3.
O. H. WATKINS.
MACHINE FOR MAKING HAY AND STRAW ROPE.
No. 458,605. Patented Sept. 1, 1891.
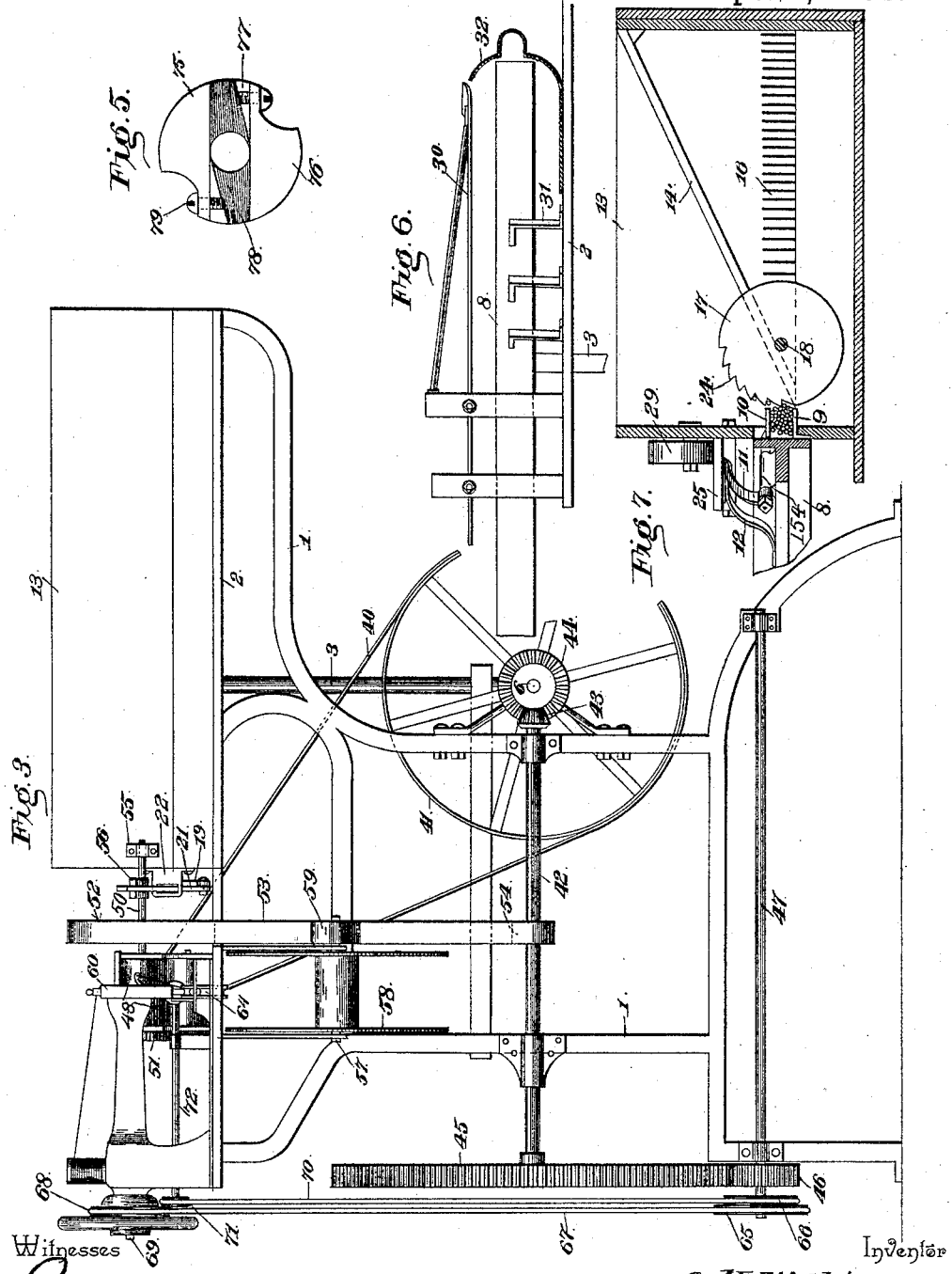

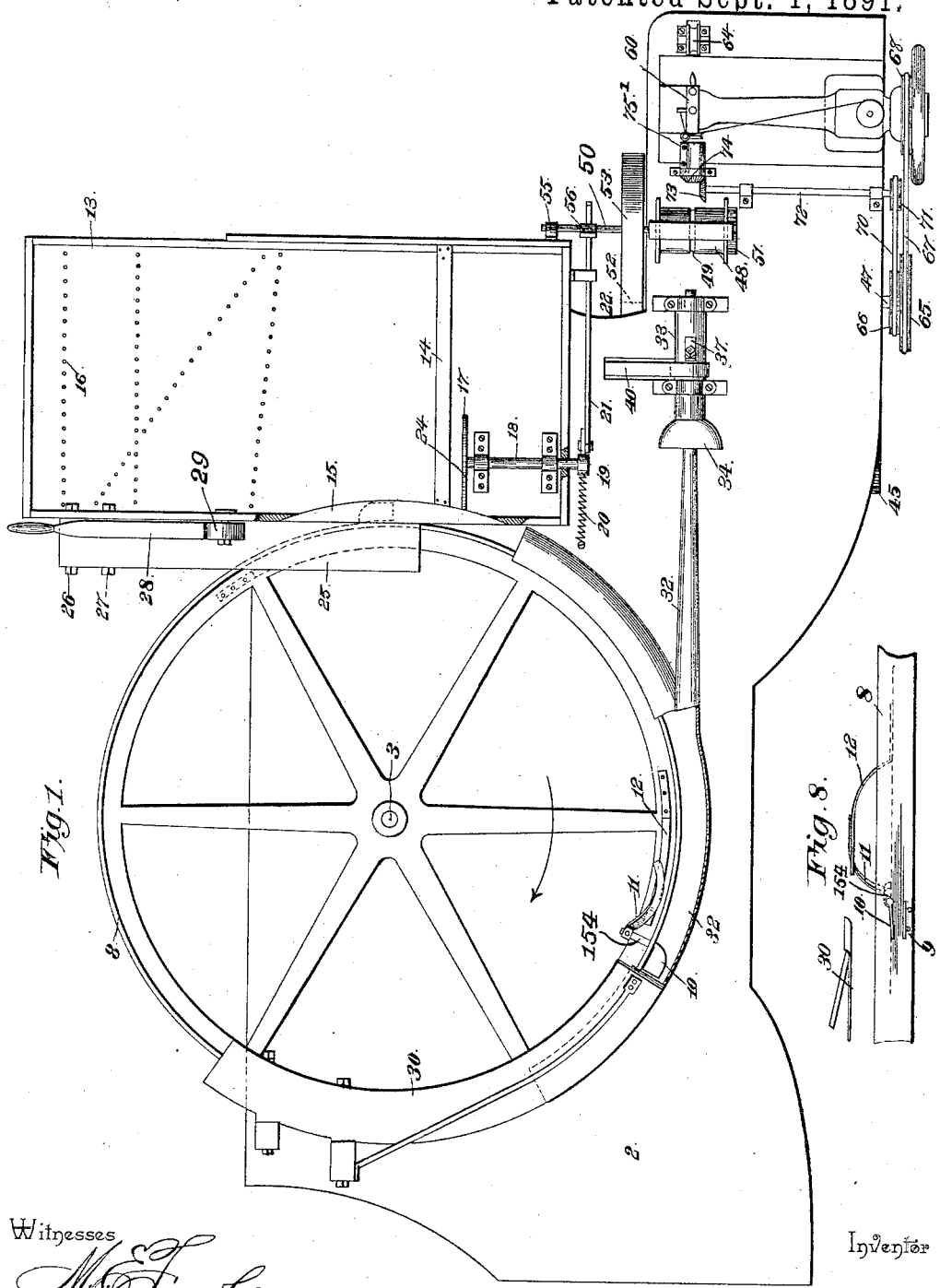

UNITED STATES PATENT OFFICE.

ORLA H. WATKINS, OF ELDORA, IOWA, ASSIGNOR OF ONE-HALF TO CHARLES E. ALBROOK, OF SAME PLACE.

MACHINE FOR MAKING HAY AND STRAW ROPE.

SPECIFICATION forming part of Letters Patent No. 458,605, dated September 1, 1891.

Application filed January 16, 1891. Serial No. 378,030. (No model.)

*To all whom it may concern:*

Be it known that I, ORLA H. WATKINS, a citizen of the United States, residing at Eldora, in the county of Hardin and State of Iowa, have invented a new and useful Machine for Making Hay and Straw Rope, of which the following is a specification.

This invention relates to an improved machine for making hay and straw rope, and it is especially designed for the manufacture of rope or twine made in accordance with Letters Patent No. 431,298, issued to myself on the 1st day of July, 1890. The rope or twine patented to me under the above number and date is composed of straws twisted together and re-enforced and fastened by thread stitched therethrough, and my improved machine accordingly comprises mechanism for feeding and twisting the hay or straw and for stitching the rope or twine thus formed, as will be hereinafter more fully described, and particularly pointed out in the claims.

In the drawings hereto annexed, Figure 1 is a plan view of a machine constructed in accordance with my invention. Fig. 2 is a front elevation of the same. Fig. 3 is a side elevation. Fig. 4 is a vertical sectional view taken longitudinally through the twisting mechanism and showing the stitching mechanism in elevation. Fig. 5 is a detail end elevation of the revolving cylindrical brush. Fig. 6 is a detail side elevation. Fig. 7 is a vertical sectional view taken through the supply box or hopper and through the rim of the feed-wheel. Fig. 8 is a detail side view of a portion of the rim of the feed-wheel having the straw-clamping jaws.

Like numerals of reference indicate like parts in all the figures.

A suitable frame-work, which is designated by 1 and which supports the table or platform 2 of my improved machine, is provided with suitable bearings for a vertical shaft 3, having at its lower end a bevel-gear 4, that meshes with a miter-gear 5 upon the driving-shaft 6. The latter is provided at one end with a drum or pulley 7, adapted to receive motion from any suitable source of power. The vertical shaft 3 carries at its upper end a horizontal wheel 8, having a flat vertical rim, which is provided with a pair of jaws or clamping devices 9 and 10, the lower one of which 9 is stationary, while the upper one 10 is mounted upon a short rock-shaft 154, journaled or pivoted in the rim of the wheel and provided at its inner end with an upwardly-extending curved arm 11, which is normally held in a raised position by the action of a suitably-arranged spring 12.

Upon the table or platform 2, at one side of the feed-wheel 8, is mounted a supply box or hopper 13, having an inclined guide-slat 14 and a feed-opening 15. The hay or straw is in practice placed lengthwise in the box, and the bottom of the latter is provided with several rows of vertical teeth or prongs 16, serving to straighten the hay or straw as it is pulled out of the box by the feed mechanism. The latter comprises a vertical disk 17, mounted upon a horizontal rock-shaft 18, journaled in the feed-box near the front end of the same and directly in front of the guide-slat 14. The end of the rock-shaft 18 extends through the front end of the feed-box, and is provided with a downwardly-extending arm 19, to which is connected one end of a spring 20, the opposite end of which is suitably attached to the table or platform. The lower end of the arm 19 is pivotally connected with a rod 21, the free end of which is supported in a bracket 22 upon the front end of the feed-box, and is provided with a notch 23 for the purpose to be hereinafter set forth. The feed-disk 17 is provided for a portion of the upper side of its periphery with teeth 24, as will be clearly seen in Fig. 7 of the drawings. The side of the feed-box adjacent to the feed-wheel 8 is provided directly above the opening 15 with an elastic board or flat spring 25, mounted upon a bolt 26 and supported by an additional bolt or pin 27. To the side of the feed-box above the spring 25 is pivoted a lever 28, having a cam-shaped head 29, adapted to bear against the upper side of the said spring, the free end of which spring may thus be depressed to any desired extent. This device is for the purpose of actuating the pivoted jaw 10, the arm 11 of which in passing under the said spring is depressed, thus causing the jaw 10 to swing open to an extent which is regulated by the position of the spring 25. When the arm 11 of the pivoted jaw passes from under the spring 25, the jaw 10 will close upon the hay or straw which has been received between itself and the stationary jaw 9, thus pulling out of the feed-box a quantity of hay or straw, which is regulated by the extent to which the receiving-jaws shall be permitted to open.

The table or platform of the machine is provided opposite to the feed-box with a suitably-supported segmental bracket 30, which partially covers the rim of the wheel and which serves in practice to engage the arms 11 of the pivoted jaws 10 for the purpose of throwing the latter open to release the hay or straw and to deliver the same to the twisting mechanism. Below the bracket 30 the table supports a series of suitable hooks 31, which are for the purpose of disengaging the hay or straw from the jaws and preventing it from being carried around with the wheel.

In front of the horizontal feed-wheel 8 is arranged the receiving-trough 32, into which the hay or straw is delivered when released from the jaws 9 and 10. The said trough is preferably curved for the greater portion of its length and made concentric with the feed-wheel 8. The discharge end of the trough 32 is preferably straight, so as to guide the hay or straw into the twisting-sleeve. The latter, which is designated by 33 and which is clearly shown in Fig. 4 of the drawings, is composed of a tubular cylinder having a flaring or funnel-shaped end, as 34. The tubular sleeve 33 is provided with slots 35 and 36 on diametrically-opposite sides. In the former of these is pivotally mounted a latch 37, the inner end of which projects into the said sleeve and the outer end of which has a set-screw 38 bearing against the outer side of said sleeve. By this means the latch is held unyieldingly in any position to which it is set by the screw 38, and the hay or straw passing beneath its tip is pressed firmly and all lumps therein crushed. In the slot 36 is journaled an anti-friction or guide roller 39, the axis of which is transverse to that of the twisting-sleeve. When the hay or straw which is to be twisted is fed into the latter, it is engaged by the latch 37 and caused to rotate with the twisting-sleeve, being thereby twisted, as will be readily understood. The twisting-sleeve is operated by a belt or band 40, which connects it with a band-wheel or pulley 41 upon the driving-shaft 6 of the machine. One end of the frame 1 is provided with bearings for a counter-shaft 42, having a pinion 43 meshing with a bevel-gear 44 upon the driving-shaft 6. One end of the counter-shaft 42 has a spur-wheel 45 meshing with a pinion 46 upon a second counter-shaft 47.

Journaled in vertical alignment in suitable bearings or brackets upon the platform or table 2, at the delivery end of the twisting cylinder 33, is a pair of rollers 48, having peripheral grooves 49, adapted to receive the twisted hay or straw as the latter issues from the twisting-cylinder. The ends of the shafts 50, carrying the rollers 48, are provided with spur-wheels or pinions 51, meshing together, and the upper shaft 50 has a band-wheel 52, connected by a belt or band 53 with a pulley 54 upon the counter-shaft 42, from which latter motion is thus transmitted to the feed-rollers 48. The shaft 50 of the upper feed-roller is extended into a bearing 55 upon one side of the feed-box, and it carries a short radially-extending arm 56, which is adapted to engage the notch 23 in the free end of the pivoted arm 21, thus imparting, through the medium of the latter and the arm 19, an intermittent vibrating motion to the rock-shaft 18, carrying the partially-toothed feed-disk 17, the retracting-spring 20 serving to pull the arm 19 of the shaft 18 in the opposite direction to that in which it is forced by the pivoted rod 21 and the arm 56 engaging the notch in the latter.

A short shaft 57, journaled, preferably, detachably in the frame of the machine, carries a drum or reel 58, upon which the finished straw rope may be wound when it issues from the machine, as will be presently more fully described.

The reel-carrying shaft 57 is provided at one end with a drum or pulley 59, which is rotated by frictional contact with the belt or band 53.

60 designates a sewing-machine of ordinary construction, which is mounted upon the platform at one side of the feed-rollers 48. Guide-rollers 61 and 62 are suitably arranged to guide the twisted material under the presser-foot of the sewing-machine, and in rear of the latter an additional pressure-roller 63 is arranged to assist in carrying the finished hay or straw rope away from the sewing-machine. A guide-roller 64 is arranged at one side of the table or platform to guide the finished rope to the winding-reel 58.

The counter-shaft 47 is provided at its front end with pulleys 65 and 66, the former of which is connected by a band 67 with a pulley 68 upon the driving-shaft 69 of the sewing-machine, to which motion is thus transmitted. The band-wheel 66 is likewise connected by means of a band 70 with a pulley 71 upon a counter-shaft 72, which is mounted upon suitable bearings upon the table or platform of the machine at right angles to the twisting-cylinder and parallel to the shafts of the feed-rollers 48. The rear end of the shaft 72 has a miter-gear 73 meshing with a similar miter-gear 74 upon one end of a cylindrical tubular brush 75, which is mounted revolubly in a suitable bearing 75 upon a table or platform between the feed-rollers and the sewing-machine. The said cylindrical tubular brush, as will be seen by reference to Fig. 5 of the drawings, is composed of a suitable shell or casing 76, having radial slots 77, in which the bristles 78 are mounted by means of set-screws 79, whose inner ends bear against said bristles. The inner ends of the bristles which face each other are adapted to bear against the twisted hay or straw rope as the latter passes through the brush, thus maintaining the twist in the latter and also serving to smooth the exterior surface, so as to prevent projecting straws from becoming entangled with the mechanism of the sewing-machine or with the thread with which it is being stitched.

The operation and advantages of my invention will be readily understood from the foregoing description, taken in connection with the drawings hereto annexed. The hay or straw is placed loosely in a feed-box or hopper 13. The several parts of the machine are driven from the main shaft 6, as will be understood from the foregoing description. The rock-shaft 18, carrying the disk 17, receives an intermittent vibrating motion from the shaft 50 of the upper feed-roller by the mechanism hereinbefore described. The action of the said feed-disk is to push a portion of the straw from the bottom of the feed-box through the feed-opening, the portion thus fed being partially supported upon the inclined feed-slat 14. When the jaws of the feed-wheel 8 come around to the feed-box, they will close upon a portion of the material thus fed and pull it out of the feed-box, the hay or straw being straightened by the action of the prongs or tines 16 in the bottom of the feed-box. The jaws of the feed-wheel carry the material into the receiving-trough, from whence, when the machine is first started, it is fed by hand, by means of a suitable rod or needle 80, into the twisting-cylinder, and thence between the feed-rollers, through the revolving brush, under the presser-foot of the sewing-machine, over the guide-roller 64, and finally to the winding reel or drum. The latter, as will be observed, is operated by friction, and will thus serve to wind the rope sufficiently tight without danger of breaking it or straining any part of the machinery, inasmuch as the drum upon the shaft of the said winding-reel may slip against the belt or band from which it receives motion. After the machine has once been started the material is fed automatically from the receiving-trough to the twisting-cylinder, inasmuch as the material which projects at the receiving end of the latter is constantly being twisted, thus becoming entangled and connected with the material which is being fed, and which is thus carried into the twisting-cylinder. The action of the bracket 30, engaging the curved arms 11 of the pivoted jaws 10 and opening the latter to release the material, will be readily understood and requires no detailed description. The general construction of the machine is simple and inexpensive, and it is very durable, as well as effective in operation.

I have in the foregoing described what I consider to be the preferred construction of my improved machine; but I desire it to be distinctly understood that I reserve the right to such changes and modifications as may be resorted to without departing from the spirit of my invention. Thus, for instance, it is not absolutely essential that the receiving-trough should be curved, as herein shown and described. Several sets of jaws might be employed upon the feed-wheel, as seen in dotted lines in Fig. 1, and other changes may be made which will readily suggest themselves to the skilled mechanic.

Having thus described my invention, what I claim is—

1. In a machine of the class described, the feed-box or hopper, the bottom of which is provided with upwardly-extending prongs or tines, substantially as and for the purpose set forth.

2. In a machine of the class described, the combination, with the feed-box or hopper, of a revolving wheel or disk provided at its periphery with jaws adapted to grasp a portion of the contents of the hopper, substantially as and for the purpose set forth.

3. In a machine of the class described, the combination of the box or hopper having a feed-opening, the prongs or tines extending upwardly from the bottom of the hopper, and the revoluble wheel or disk having jaws adapted to grasp a portion of the contents of the hopper, substantially as and for the purpose set forth.

4. The combination of the feed-box having a suitable opening, a gage-board arranged adjustably above said opening, and a revoluble wheel or disk having jaws, one of which is pivoted and provided with a curved arm adapted to engage the said gage-board, substantially as set forth.

5. The combination of the feed-box having a suitable opening, a spring or elastic gage-board arranged above said opening, a lever having a cam-shaped head adapted to engage said gage-board, the revoluble wheel or disk, and a fixed and a pivoted jaw mounted upon the latter, said pivoted jaw being provided with a curved arm to engage the said gage-board, substantially as set forth.

6. The combination, with the hopper, of the prongs or tines extending upwardly from the bottom of the same, the inclined guide-slat, the toothed feed-disk, and the revoluble feed-wheel having jaws adapted to grasp a portion of the contents of the box or hopper, substantially as and for the purpose set forth.

7. In a machine of the class described, the combination of the feed-box or hopper, a shaft mounted in suitable bearings in the same and carrying a partially-toothed feed-disk and provided at its projecting ends with an arm or lever, a retracting-spring and an operating-rod connected with said arm, said rod being provided with a notch near its outer end, a bracket to support the free end of said operating-rod, and an arm mounted upon a revoluble shaft and adapted to engage the notch at the outer end of said operating-rod, thus imparting an intermittent oscillating vibrating motion to the shaft carrying the feed-disk, substantially as and for the purpose set forth.

8. In a machine of the class described, the combination of the feed-box or hopper, the revoluble feed-wheel having jaws adapted to grasp a portion of the contents of the hopper, and a receiving-trough to receive the material carried from the box or hopper by the jaws of the feed-wheel, substantially as set forth.

9. The combination of the feed-box or hopper, the revoluble feed-wheel having stationary and pivoted jaws, the latter being provided with curved arms, the spring or elastic gage-plate mounted adjustably upon the feed-box or hopper above the escape-opening of the latter, a segmental bracket arranged above the rim of the feed-wheel and adapted to engage the curved arm of the pivoted jaw of the feed-wheel, and the receiving-trough, substantially as and for the purpose set forth.

10. The combination, with the revolving feed-wheel having the stationary and the pivoted jaws, the latter being provided with a curved arm at its inner end, of the segmental bracket arranged above the rim of the feed-wheel and adapted to engage said curved arm, and hooks attached to said bracket and adapted to pass between the jaws when the latter are separated, substantially as set forth.

11. The combination of the hopper, the revoluble feed-wheel having the stationary and the pivoted jaws, mechanism for operating the latter, the receiving-trough, and twisting mechanism arranged at the discharge end of the latter, substantially as and for the purpose set forth.

12. In a machine of the class described, the combination, with the hopper, the feed-wheel having the stationary and the pivoted jaws, mechanism for operating the latter, and the receiving-trough, of the tubular twisting-cylinder mounted revolubly at the discharge end of said trough and having a latch or tongue adapted to engage the material passing through said twisting-cylinder, substantially as and for the purpose set forth.

13. In a machine of the class described, the combination of the hopper or feed-box, the receiving-trough, mechanism for carrying material from the hopper to the said trough, and the tubular twisting-cylinder mounted revolubly at the discharge end of the latter, substantially as and for the purpose set forth.

14. In a machine of the class described, the combination of the feed-box or hopper having a suitable opening and the bottom of which is provided with upwardly-extending prongs or tines, the receiving-trough, mechanism for carrying the contents of the hopper to the feed-trough and delivering it into the latter, and a twisting mechanism arranged at the discharge end of said trough, substantially as and for the purpose set forth.

15. In a machine of the class described, the herein-described tubular twisting-cylinder having a longitudinal slot and an unyielding tongue or latch mounted pivotally in the said slot, substantially as set forth.

16. In a machine of the class described, the combination of the feed-box or hopper, the receiving-trough, the revoluble feed-wheel having jaws for carrying the contents of the hopper to the receiving-trough, and the twisting-cylinder mounted revolubly at the discharge end of the latter, substantially as and for the purpose set forth.

17. In a machine of the class described, the combination of the feed-box or hopper, the receiving-trough, mechanism for carrying the contents of the hopper to said trough, the twisting-cylinder mounted revolubly at the discharge end of the latter, and the peripherally-grooved geared rollers arranged transversely to the twisting-cylinder at the discharge end of the latter, substantially as and for the purpose set forth.

18. In a machine for twisting hay and straw rope, the combination of the feed-box or hopper, the receiving-trough, mechanism for carrying the contents of the hopper into said trough, twisting mechanism arranged at the discharge end of the latter, and mechanism for sewing or stitching the twisted material after it issues from the twisting mechanism, the whole arranged to form an organized machine, substantially as set forth.

19. In a machine of the class described, the combination of the feed-box or hopper, the receiving-trough, mechanism for carrying the contents of the hopper into the said trough, the twisting mechanism arranged at the discharge end of the latter, the peripherally-grooved carrying-rollers, sewing mechanism arranged to stitch the twisted material issuing from the carrying-rollers and twisting mechanism, and suitable operating mechanism whereby the several instrumentalities are connected and adapted to operate in unison, substantially as and for the purpose set forth.

20. In a machine of the class described, the combination, with the feeding, the carrying, the stitching, and the twisting mechanisms, of a revoluble cylindrical tubular brush comprising a shell having inwardly-facing bristles adapted to engage and to smooth the twisted material, substantially as and for the purpose set forth.

21. In a machine for manufacturing hay and straw rope, the combination, with the twisting devices, of a revoluble tubular brush comprising a shell having inwardly-facing bristles adapted for the passage of the twisted material, substantially as and for the purpose herein set forth.

22. The herein-described revoluble brush, consisting of a cylindrical shell or casing having radial slots, in combination with the bristles mounted in said slots, substantially as and for the purpose set forth.

23. In a machine of the class described, the herein-described revoluble tubular brush, consisting of a cylindrical shell or casing having radial slots, the brushes mounted adjustably and detachably in the said slots, and the fastening-screws therefor, substantially as and for the purpose set forth.

24. In a machine of the class described, the combination, with the feeding and carrying mechanisms, of the revoluble cylindrical brush and the sewing or stitching mechanism, substantially as and for the purpose set forth.

25. In a machine of the class described, the combination of the feeding, the carrying, and the twisting mechanisms, the revoluble tubular brush, the sewing or stitching mechanism, and the guide-rollers arranged to carry the twisted material through the stitching mechanism, substantially as and for the purpose set forth.

26. In a machine of the class described, the combination of the feed-trough or hopper having a suitable opening, the prongs or tines extending upwardly from the bottom of said hopper, the spring or elastic gage-plate, mechanism for adjusting the free end of the latter, the revoluble feed-wheel having stationary and pivoted jaws, the latter being provided with curved arms, a segmental bracket to engage the latter, the receiving-trough, the twisting mechanism, the carrying-rollers, the revoluble tubular brush, the sewing or stitching mechanism, and a winding-reel, substantially as and for the purpose herein set forth.

27. In a machine of the class described, the combination, with the feeding devices, the twisting mechanism, the revoluble tubular brush, and the sewing mechanism, of driving belts and gears and a winding-reel having a pulley operated by frictional contact with one of said belts, as and for the purpose set forth.

28. In a machine of the class described, the combination, with the feeding devices and the sewing mechanism, of driving belts and gears and a winding-reel having a pulley operated by frictional contact with one of said belts, as and for the purpose set forth.

29. In a machine of the class described, the combination, with the feeding devices, the twisting mechanism, and the revoluble tubular brush, of driving belts and gears and a winding-reel having a pulley operated by frictional contact with one of said belts, as and for the purpose set forth.

In testimony that I claim the foregoing as my own I have hereto affixed my signature in presence of two witnesses.

ORLA H. WATKINS.

Witnesses:
F. E. BROWN,
F. A. DENNISON.